US009794064B2

(12) United States Patent
Anderson et al.

(10) Patent No.: US 9,794,064 B2
(45) Date of Patent: Oct. 17, 2017

(54) CLIENT(S) TO CLOUD OR REMOTE SERVER SECURE DATA OR FILE OBJECT ENCRYPTION GATEWAY

(71) Applicant: SECTURION SYSTEMS, INC., Clearfield, UT (US)

(72) Inventors: Jordan Anderson, Centerville, UT (US); Richard J. Takahashi, Layton, UT (US); Sean Little, N. Salt Lake, UT (US); Lee Noehring, Peoria, AZ (US)

(73) Assignee: SECTURION SYSTEMS, INC., Clearfield, UT (US)

( * ) Notice: Subject to any disclaimer, the term of this patent is extended or adjusted under 35 U.S.C. 154(b) by 0 days.

(21) Appl. No.: 15/264,840

(22) Filed: Sep. 14, 2016

(65) Prior Publication Data

US 2017/0085372 A1 Mar. 23, 2017

Related U.S. Application Data

(60) Provisional application No. 62/219,795, filed on Sep. 17, 2015.

(51) Int. Cl.
*H04L 29/06* (2006.01)
*H04L 9/08* (2006.01)

(52) U.S. Cl.
CPC ............ *H04L 9/08* (2013.01); *H04L 63/0435* (2013.01); *H04L 63/08* (2013.01); *H04L 63/166* (2013.01)

(58) Field of Classification Search
CPC ....... H04L 9/08; H04L 63/0435; H04L 63/08; H04L 63/166
See application file for complete search history.

(56) References Cited

U.S. PATENT DOCUMENTS

| 5,892,962 | A | 4/1999 | Cloutier |
| 5,961,626 | A | 10/1999 | Harrison et al. |
| 6,044,388 | A | 3/2000 | DeBellis et al. |
| 6,081,895 | A | 6/2000 | Harrison et al. |
| 6,101,255 | A | 8/2000 | Harrison et al. |
| 6,304,973 | B1 | 10/2001 | Williams |
| 6,550,012 | B1 | 4/2003 | Villa et al. |
| 6,577,734 | B1 | 6/2003 | Etzel et al. |

(Continued)

OTHER PUBLICATIONS

Carbonite White Paper—The Better Backup Plan, Making Sense of the Cloud.

(Continued)

*Primary Examiner* — Mohammad A Siddiqi
(74) *Attorney, Agent, or Firm* — Greenberg Traurig LLP

(57) ABSTRACT

Systems and methods to send or write data or file objects to a remote cloud storage or data server using an encryption gateway. In one embodiment, a communication system includes: an encryption gateway configured to receive TLS (or an equivalent security) encrypted data in a payload from a client application, to terminate the client TLS connection, and to extract the payload and encrypt the payload data with keys from the key manager. The encryption gateway establishes a TLS connection and inserts the encrypted-authenticated data into the TLS payload and sends or writes the TLS encrypted data to a remote cloud storage or data server for storage. The system further includes a key manager configured to provide at least one key to the encryption gateway for encryption of the data in the payload.

19 Claims, 9 Drawing Sheets

(56) References Cited

U.S. PATENT DOCUMENTS

| | | |
|---|---|---|
| 6,598,161 B1 | 7/2003 | Klutz et al. |
| 6,845,446 B1 | 1/2005 | Fuller |
| 7,171,000 B1 | 1/2007 | Toh et al. |
| 7,200,756 B2 | 4/2007 | Griffin et al. |
| 7,421,576 B1 * | 9/2008 | Kent .................. H04L 63/0838 |
| | | 380/277 |
| 7,644,268 B2 | 1/2010 | Filipi-Martin et al. |
| 7,716,467 B1 | 5/2010 | Deffet et al. |
| 7,773,754 B2 | 8/2010 | Buer et al. |
| 7,921,288 B1 | 4/2011 | Hildebrand |
| 7,996,670 B1 | 8/2011 | Krishna et al. |
| 8,065,713 B1 | 11/2011 | Vainstein et al. |
| 8,073,949 B2 | 12/2011 | Cunchon et al. |
| 8,166,289 B2 | 4/2012 | Owens et al. |
| 8,229,116 B2 | 7/2012 | Ogata |
| 8,234,686 B2 | 7/2012 | Alvermann et al. |
| 8,266,433 B1 | 9/2012 | Przykucki et al. |
| 8,275,984 B2 | 9/2012 | Loveless |
| 8,289,975 B2 | 10/2012 | Suganthi et al. |
| 8,416,954 B1 | 4/2013 | Raizen et al. |
| 8,418,252 B2 | 4/2013 | Akyol et al. |
| 8,433,783 B2 | 4/2013 | Jackowski et al. |
| 8,433,929 B2 | 4/2013 | Yamashita et al. |
| 8,438,626 B2 | 5/2013 | Anderson et al. |
| 8,443,069 B2 | 5/2013 | Bagapelli et al. |
| 8,479,304 B1 | 7/2013 | Clifford |
| 8,595,814 B2 | 11/2013 | Le et al. |
| 8,631,460 B2 | 1/2014 | Shea et al. |
| 8,988,713 B2 | 3/2015 | Gutnik et al. |
| 9,227,139 B2 | 1/2016 | Mamtani et al. |
| 9,306,917 B2 | 4/2016 | Brugger et al. |
| 9,317,718 B1 | 4/2016 | Takahashi |
| 9,355,279 B1 | 5/2016 | Takahashi |
| 9,374,344 B1 | 6/2016 | Takahashi |
| 9,374,345 B2 | 6/2016 | Brugger et al. |
| 9,378,359 B2 * | 6/2016 | Qureshi .................. G06F 21/53 |
| 9,560,019 B2 * | 1/2017 | Barney ............... H04L 63/0428 |
| 2002/0091975 A1 | 7/2002 | Redlich et al. |
| 2002/0099959 A1 | 7/2002 | Redlich et al. |
| 2002/0165961 A1 | 11/2002 | Everdell et al. |
| 2003/0012373 A1 | 1/2003 | Ogura et al. |
| 2003/0014627 A1 | 1/2003 | Krishna et al. |
| 2003/0051054 A1 | 3/2003 | Redlich et al. |
| 2003/0070077 A1 | 4/2003 | Redlich et al. |
| 2003/0119484 A1 | 6/2003 | Adachi et al. |
| 2003/0120949 A1 | 6/2003 | Redlich et al. |
| 2003/0172279 A1 | 9/2003 | Yudasaka |
| 2003/0182435 A1 | 9/2003 | Redlich et al. |
| 2003/0196108 A1 | 10/2003 | Kung |
| 2004/0054914 A1 | 3/2004 | Sullivan |
| 2005/0132070 A1 | 6/2005 | Redlich et al. |
| 2005/0138109 A1 | 6/2005 | Redlich et al. |
| 2005/0138110 A1 | 6/2005 | Redlich et al. |
| 2005/0198412 A1 | 9/2005 | Pedersen et al. |
| 2006/0059537 A1 | 3/2006 | Alvermann et al. |
| 2006/0133604 A1 | 6/2006 | Buer et al. |
| 2006/0149965 A1 | 7/2006 | Sharma |
| 2006/0174102 A1 | 8/2006 | Smith et al. |
| 2007/0067634 A1 | 3/2007 | Siegler |
| 2007/0136801 A1 | 6/2007 | Le et al. |
| 2007/0192596 A1 | 8/2007 | Otsuka |
| 2007/0195951 A1 | 8/2007 | Leung |
| 2007/0204159 A1 | 8/2007 | Hara |
| 2008/0062803 A1 | 3/2008 | Fronte et al. |
| 2008/0168135 A1 | 7/2008 | Redlich et al. |
| 2009/0178144 A1 | 7/2009 | Redlich et al. |
| 2009/0254572 A1 | 10/2009 | Redlich et al. |
| 2009/0327617 A1 | 12/2009 | Fruichi et al. |
| 2010/0010968 A1 | 1/2010 | Redlich et al. |
| 2010/0115260 A1 | 5/2010 | Venkatesan |
| 2010/0153702 A1 | 6/2010 | Loveless |
| 2010/0161981 A1 | 6/2010 | Dodgson et al. |
| 2010/0198730 A1 | 8/2010 | Ahmed et al. |
| 2010/0250497 A1 | 9/2010 | Redlich et al. |
| 2010/0278338 A1 | 11/2010 | Chang et al. |
| 2011/0154031 A1 | 6/2011 | Banerjee et al. |
| 2011/0252480 A1 * | 10/2011 | Patawaran ............... G06F 21/78 |
| | | 726/26 |
| 2012/0066509 A1 | 3/2012 | Lapp et al. |
| 2012/0110316 A1 | 5/2012 | Chamberlain et al. |
| 2012/0159183 A1 | 6/2012 | Adams et al. |
| 2012/0204032 A1 * | 8/2012 | Wilkins .................. H04L 9/006 |
| | | 713/170 |
| 2012/0213360 A1 | 8/2012 | Le Quéré |
| 2013/0077788 A1 | 3/2013 | Blanchard et al. |
| 2013/0254542 A1 | 9/2013 | Buer et al. |
| 2013/0305039 A1 * | 11/2013 | Gauda ................. G06F 21/6218 |
| | | 713/153 |
| 2014/0013123 A1 | 1/2014 | Khazan et al. |
| 2014/0013452 A1 | 1/2014 | Aissi et al. |
| 2014/0108782 A1 | 4/2014 | Salinger et al. |
| 2014/0122866 A1 | 5/2014 | Haeger et al. |
| 2014/0143533 A1 | 5/2014 | Ganong et al. |
| 2014/0195798 A1 | 7/2014 | Brugger et al. |
| 2014/0245007 A1 | 8/2014 | Buer et al. |
| 2014/0324698 A1 | 10/2014 | Dolcino et al. |
| 2015/0074409 A1 | 3/2015 | Reid et al. |
| 2015/0095645 A1 * | 4/2015 | Eldar .................. G06F 21/6209 |
| | | 713/168 |
| 2015/0188893 A1 | 7/2015 | Sood |
| 2015/0222604 A1 | 8/2015 | Ylonen |
| 2015/0256518 A1 | 9/2015 | Buer et al. |
| 2015/0271151 A1 | 9/2015 | Brugger et al. |
| 2016/0219024 A1 * | 7/2016 | Verzun .................. H04L 63/102 |
| 2017/0083725 A1 | 3/2017 | Takahashi |

OTHER PUBLICATIONS

Carbonite White Paper—The Better Backup Plan, Trouble Free Backup Solutions.

Blum, Thomas et al. Worcester Polytechnic Institute ECE Department. "Montgomery Modular Exponentiation on Reconfigurable Hardware" Apr. 1999. pp. 1-8, 8 pages.

Nedjah, Nadia et al. State University of Rio de Janeiro, Department de Systems of Engineering and Computation. "Systolic Hardware Implementation for the Montgomery Modular Multiplication." 6 pages.

McIvor et al. The Institute of Electronics, Communications and Information Technology (ECIT) "High-Radix Systolic Modular Multiplication on Reconfigurable Hardware." 2005. pp. 13-18, 6 pages.

Korean Intellectual Property Office; PCT International Search Report, issued in connection with PCT/US2016/051834; Dec. 21, 2016; 3 pages; Korea.

Korean Intellectual Property Office; PCT Written Opinion of the International Searching Authority, issued in connection with PCT/US2016/051834; Dec. 21, 2016; 8 pages; Korea.

* cited by examiner

FIGURE 5: Client and Servers Use TLS (HTTPS) Connections

FIGURE 7: Client use HTTP & Servers Use TLS (HTTPS)

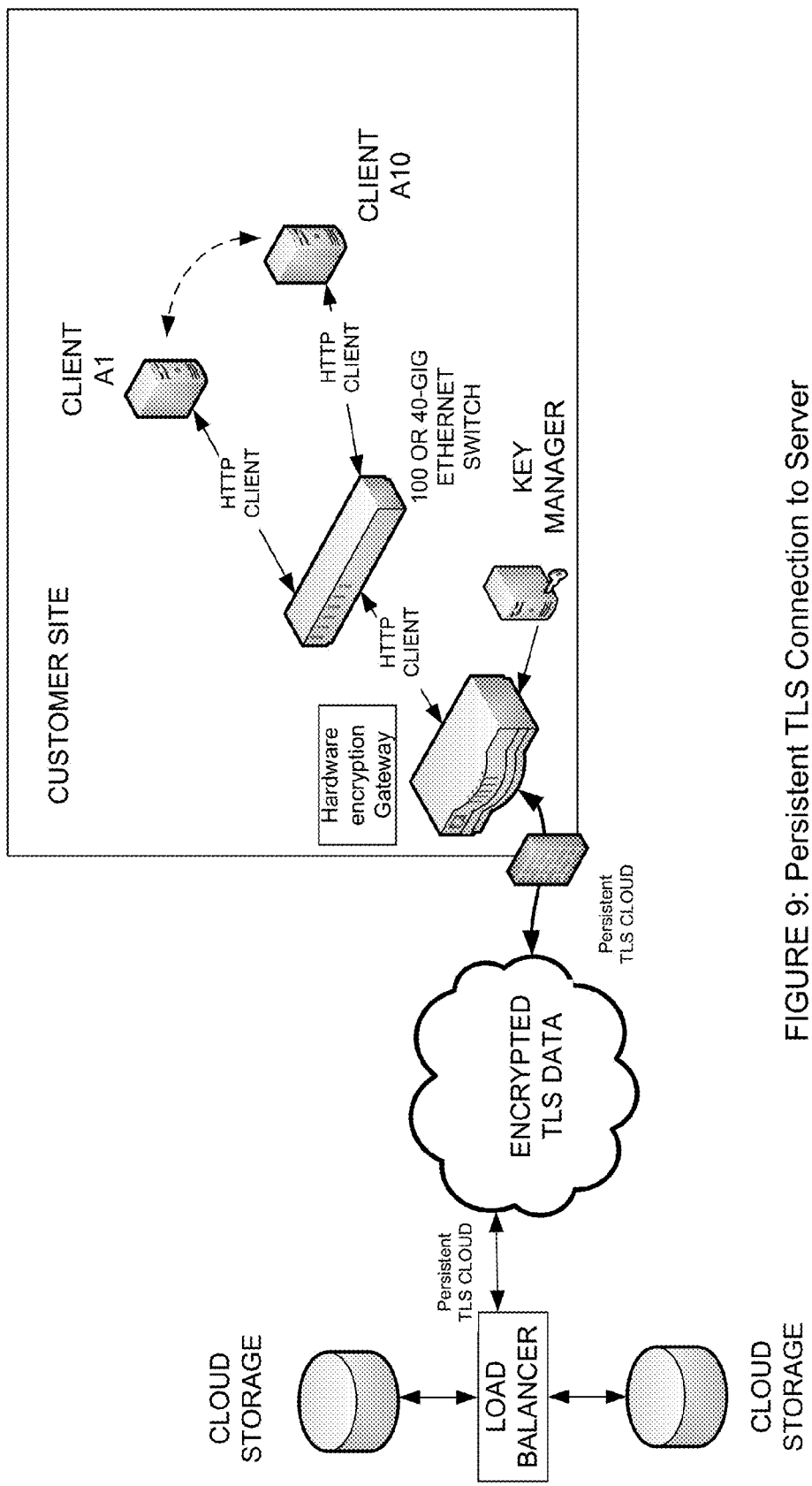
FIGURE 9: Persistent TLS Connection to Server

CLIENT(S) TO CLOUD OR REMOTE SERVER SECURE DATA OR FILE OBJECT ENCRYPTION GATEWAY

RELATED APPLICATIONS

This application claims priority to U.S. Provisional Application Ser. No. 62/219,795, filed Sep. 17, 2015, entitled "CLIENT(S) TO CLOUD OR REMOTE SERVER SECURE DATA OR FILE OBJECT ENCRYPTION GATEWAY," by Anderson et al., the entire contents of which application is incorporated by reference as if fully set forth herein.

This application is related to U.S. patent application Ser. No. 14/219,651, filed Mar. 19, 2014, entitled "SECURE END-TO-END COMMUNICATION SYSTEM," by Richard J. Takahashi, the entire contents of which application is incorporated by reference as if fully set forth herein.

This application is related to U.S. patent application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, the entire contents of which application is incorporated by reference as if fully set forth herein.

FIELD OF THE TECHNOLOGY

At least some embodiments disclosed herein relate to security processing or storage in general.

BACKGROUND

Currently, remote cloud and server systems are protected by distributed software based encryption in which each client generates and handles cryptographic keys and encrypts its data before transmission. Distributed encryption (local client to remote server) adds extensive CPU overhead-computing to clients and allows a very wide attack vector. For example, adversaries can penetrate several clients at one time because each individual client uses a software-based encryption that insecurely stores the keys. The adversary illegally accesses (hacks) the client's machine and copy the cryptographic keys undetected. Also, the user of the client machine and the information technology network personnel are potential threats that can copy the cryptographic keys and sell/give to an adversary. A distributed encryption system with hundreds of clients increases the burden of support network personnel to protect the network from both external and internal attackers or threats. Additionally, software encryption is susceptible to malicious hacking and covert modifications.

SUMMARY OF THE DESCRIPTION

Systems and methods to send or write data or a file object to a remote cloud storage or data server using a centralized encryption gateway are described herein. Some embodiments are summarized in this section.

One embodiment replaces a distributed encryption solution for data object storage with a centralized encryption solution, which is more reliable, secure, and manageable and in many cases provides much higher performance.

In one embodiment, a centralized encryption system and centralized key manager is significantly easier to manage and protect than a distributed encryption/key manager system.

In one embodiment, a payload encryption method uses symmetric encryption algorithms with authentication to encrypt or decrypt a payload file object or data. The gateway encrypts the payload (file object or data) using a specific key associated to the client and/or object. The gateway then encrypts the payload to a remote-side transport encryption protocol and sends the encrypted payload to a remote server or cloud server.

In one embodiment, a system includes: a first computing device configured as an encryption gateway, the first computing device comprising at least one processor (e.g., for data path and/or cryptographic processing) and at least one memory, the encryption gateway configured to receive data in a payload from a client application (e.g., the client application can be implemented in either hardware or software), to encrypt the data, and to send or write the encrypted data to a remote cloud storage or a data server; a router or switch, configured to provide, via local-side transport, the payload from the client application to the encryption gateway; and a key manager, the key manager configured to provide at least one key to the encryption gateway for encryption of the data in the payload, wherein at least one key is associated to the client application (or the corresponding client) or the payload, and the encryption of the data uses a remote-side transport protocol associated with the remote cloud storage or server.

In one embodiment, a method includes: receiving, by an encryption gateway from a hardware or software client application, a request to read data from a remote cloud storage or server; receiving the data in a first payload from the remote cloud storage or server, wherein the data has been encrypted using a remote-side transport protocol associated with the remote cloud storage or data server; decrypting, by at least one processor of the encryption gateway, the received data in the first payload using the remote-side transport protocol, wherein the decrypting uses a key of the client application and the key is retrieved from a memory; encrypting, by the encryption gateway, the first payload using a client-side transport protocol; and sending, from the encryption gateway to the client application, the encrypted first payload (for a non-limiting example, see FIG. 1).

In one embodiment, an encryption gateway includes at least one processor; and memory storing instructions configured to instruct at least one processor to: receive, via local-side transport, data in a payload from a client application; receive, from a key manager, at least one key for encryption of the data in the payload, wherein at least one key is associated to the client application or the payload; encrypt the data in the payload, the encryption using a remote-side transport protocol associated with a remote cloud storage or server; and send or write the encrypted data to the remote cloud storage or server.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 9 shows persistent TLS (HTTPS) connections to server in one embodiment.

DESCRIPTION

The following description and drawings are illustrative and are not to be construed as limiting. Numerous specific details are described to provide a thorough understanding. However, in certain instances, well known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Described below is a client(s) to cloud or remote server secure communication system that connects from the clients to the gateway to the cloud and/or any remote servers. In one embodiment, the data is double encrypted in transit at 10 Gigabits to 100 Gigabits or higher data rates.

As used herein, "HTTPS" is equivalent to HTTP over TLS or SSL (or another equivalent security).

Figure 1:
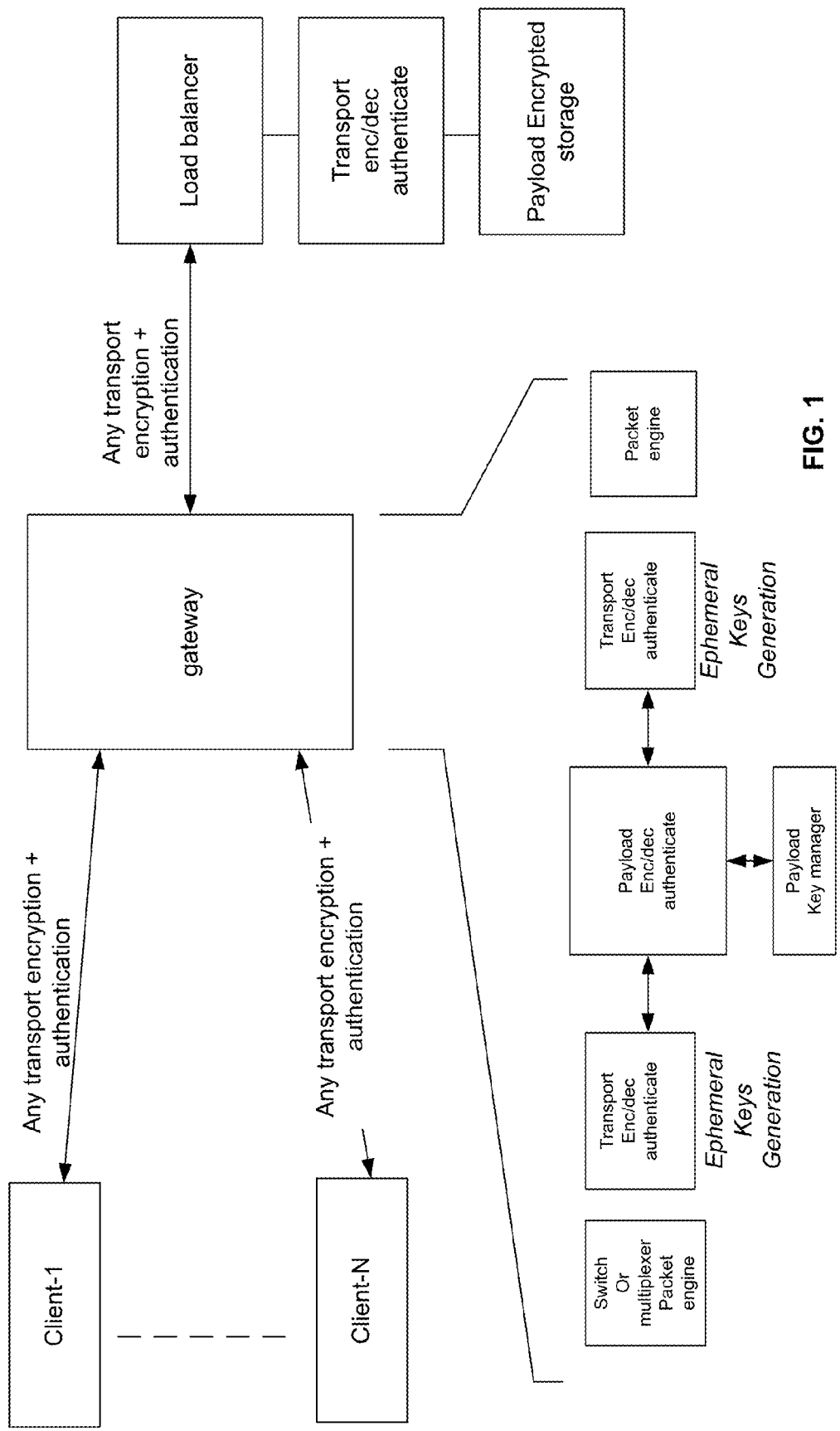
FIG. 1 shows a top level diagram of a communication system in one embodiment.
Figure 2:
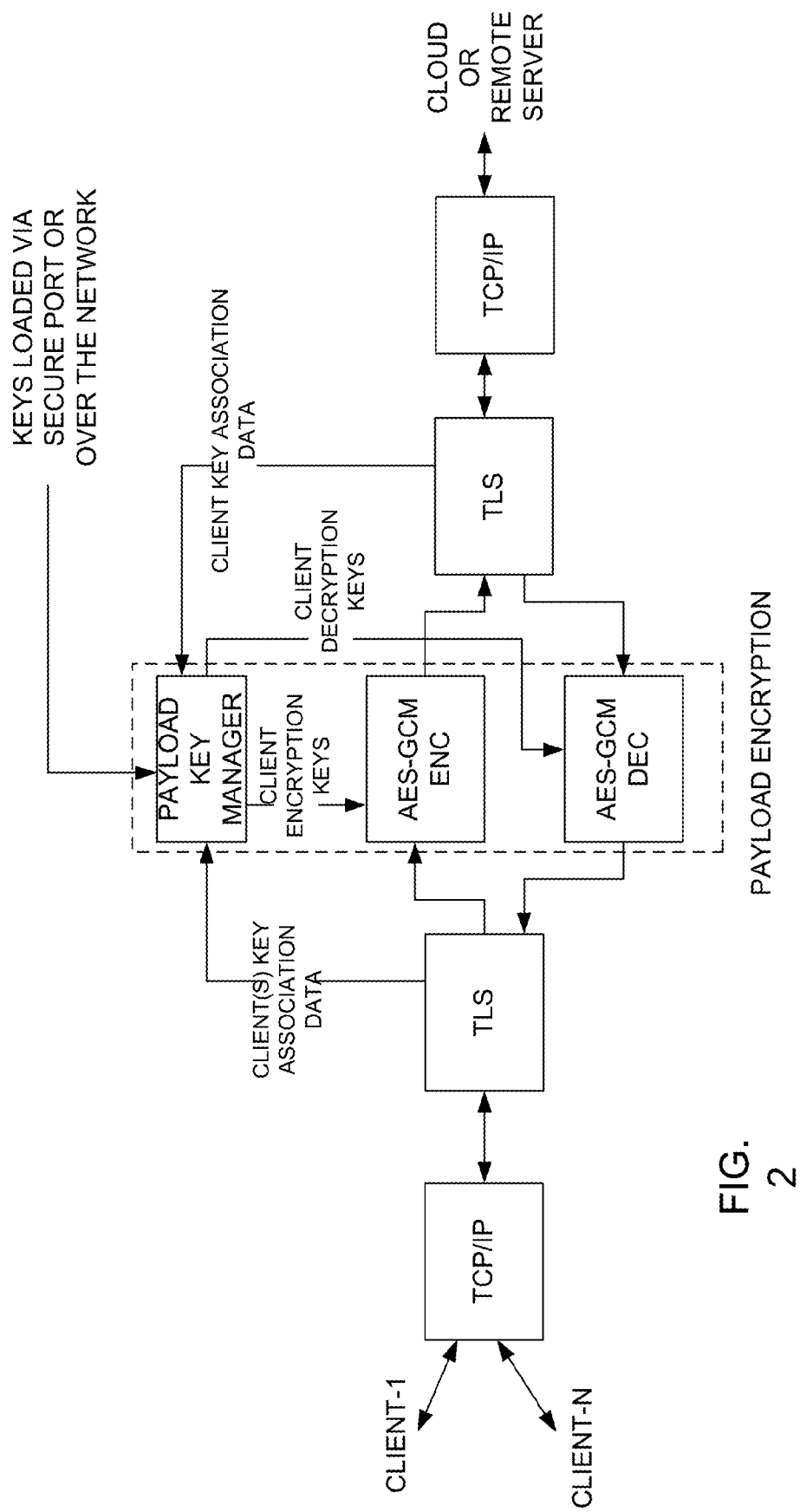
FIG. 2 shows detailed TLS implementation details of one embodiment.
Figure 3:
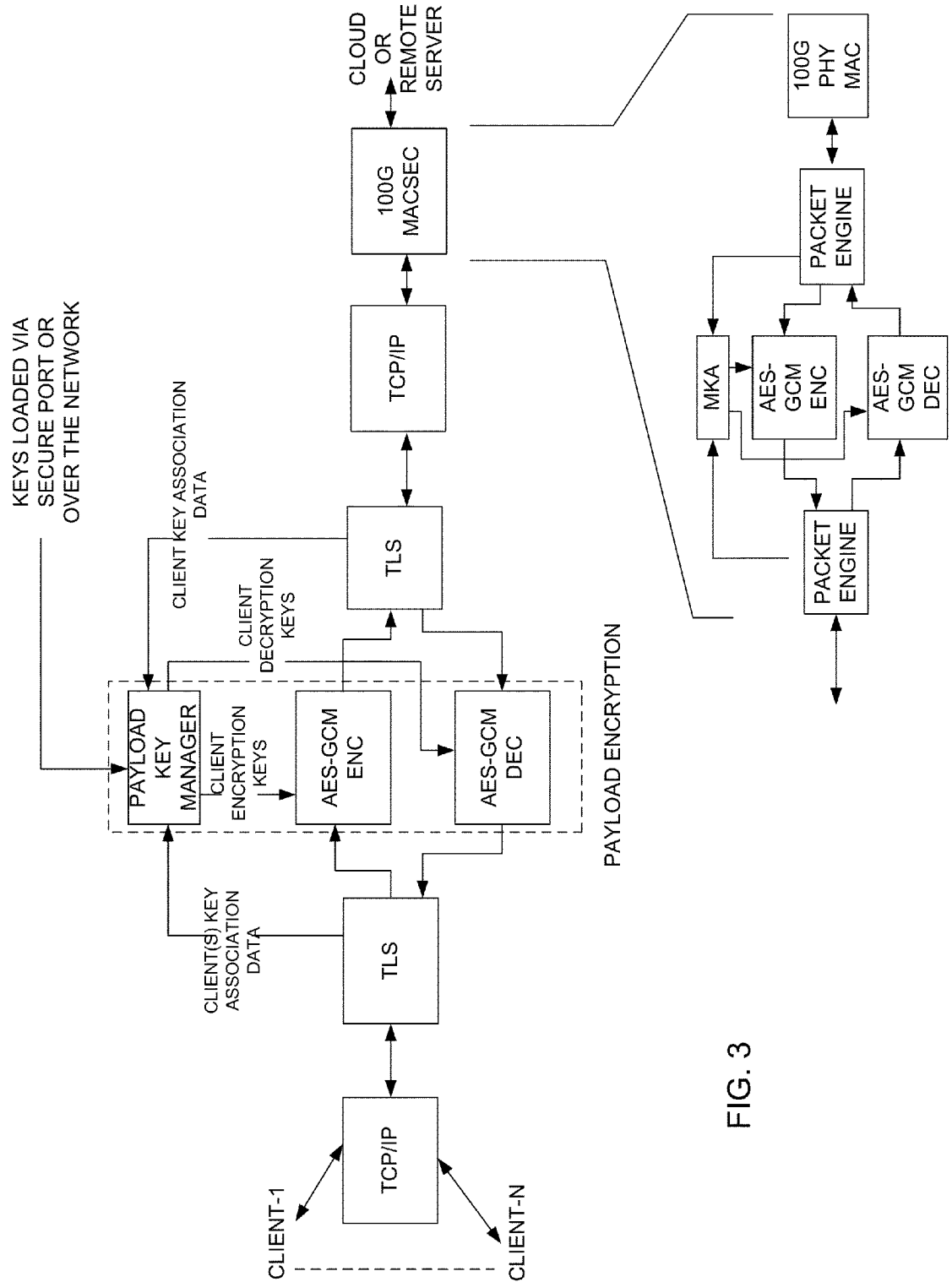
FIG. 3 shows detailed TLS/MACSEC implementation details of one embodiment.
Figure 4:
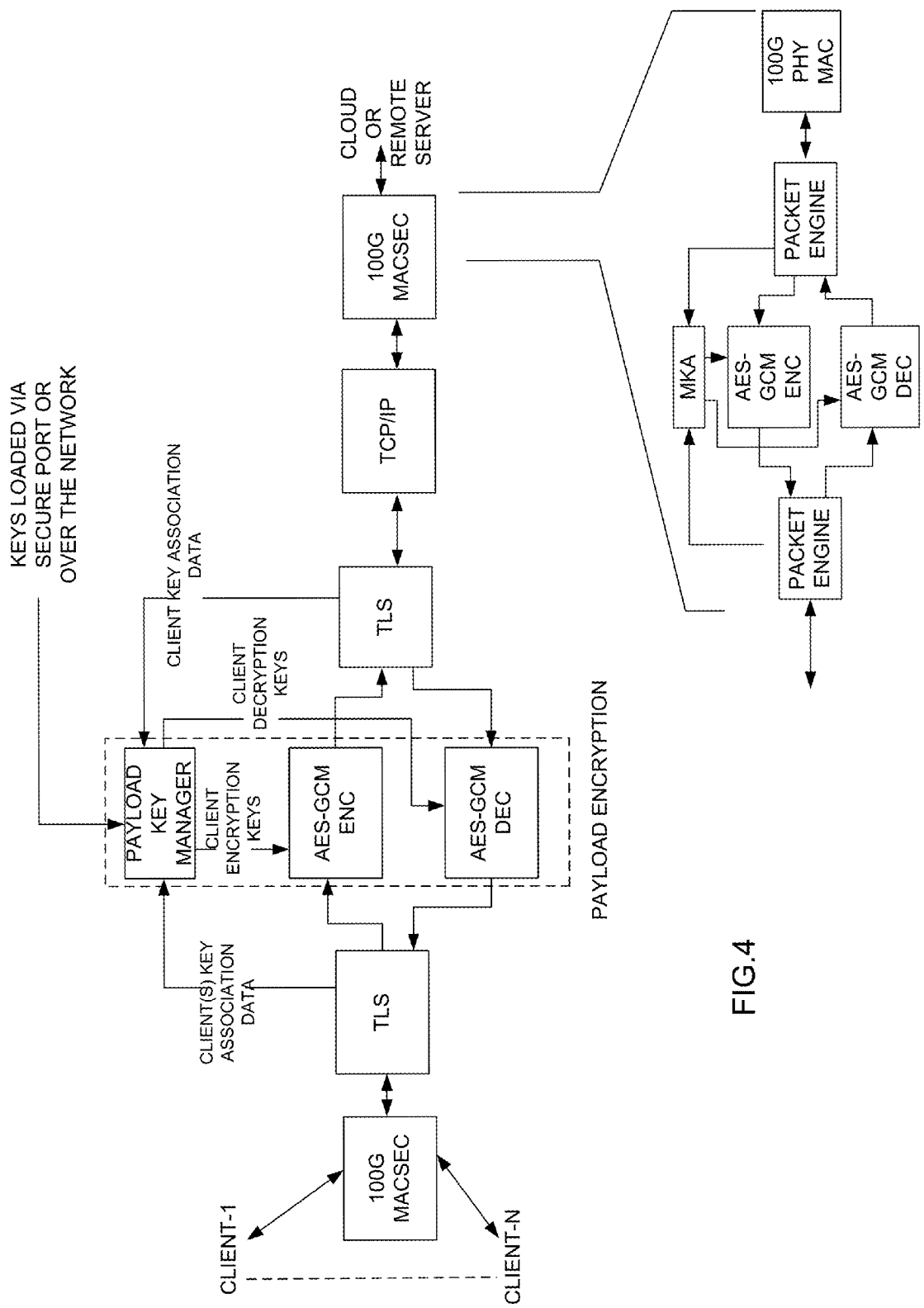
FIG. 4 shows detailed MACSEC implementation details of one embodiment.

FIGS. 1-4 show example embodiments of the communication system. FIG. 1 illustrates an example of the communication system in situ. FIG. 2 illustrates an embodiment of the system with TLS transport security on both local and remote sides of the system. FIG. 3 illustrates an embodiment of the system with TLS transport security on local side and MACSEC transport security on the remote side of the system. FIG. 4 illustrates an embodiment of the system with MACSEC transport security on both local and remote sides of the system.

Data Flow:

In one embodiment, a local client sends or writes data to the cloud or remote server flow. The client uses any transport encryption method on the file object or data to the gateway. The gateway decrypts the local-side transport to yield the plain text file object or data. The gateway encrypts the payload (file object or data) using a specific key associated to the client and/or object. The gateway then encrypts the payload to the remote-side transport encryption protocol and sends to the remote server or cloud server. The remote server or cloud server decrypts the transport protocol. At this time, the payload is still encrypted by the client's key. The encrypted payload data is then stored. The aggregated gateway terminates remote side communication (e.g., MACSEC, IPSEC, TLS), performs encryption as required on the TCP stream of data (e.g., encrypt a file object in a file transfer stream), and then performs new independent transport encryption (e.g., TCP and TLS sessions) on the remote side.

In one embodiment, data is read or local client receives data from the cloud or remote server. The client requests that the remote server or cloud server reads the encrypted stored data. The remote server or cloud server encrypts the data using remote-side transport protocol. The gateway receives the data and decrypts the remote-side transport protocol. Next, using the client's key, the gateway decrypts the payload file object or data and then encrypts the data using the client-side transport protocol. The client receives the transport data and decrypts. The aggregated gateway terminates local side communication (e.g., TCP and TLS sessions), performs decryption as required on the TCP stream of data (e.g., encrypt a file object in a file transfer stream), and then performs new independent transport encryption (e.g., MACSEC, IPSEC, TLS) on the remote side.

Transport Encryption:

In one embodiment, the transport encryption method is used to protect the data during transmission between physical sites or buildings (i.e., point-to-point encryption). The transport encryption method can be, for example, an industry standard such as, for example, TLS (Transport Security Layer), IPSec (Internet Protocol Security), MACSEC (IEEE MAC Security standard), or any custom transport protocol. In one embodiment, TLS, MACSEC, IPSec all have authentication information that will be used to associate the client's payload keys.

Payload Encryption:

In one embodiment, the payload encryption method uses symmetric encryption algorithms with authentication (e.g., AES-GCM) to encrypt or decrypt the payload file object or data. The symmetric encryption algorithms with authentication is required to associate the proper client's payload key to the file object or data. The payload key manager facilitates the loading of client payload keys into the gateway. The client keys can be either loaded via a secure port or over the network using a secure method. Once the key are loaded into the gateway, the keys are pre-associated to the clients that are connected to the gateway. The client's key is associated to the client based on the information provided by the transport encryption method. Once the client keys are loaded into the gateway, the client's keys cannot be read or exposed. The payload key manager communicates with transport encryption protocol to determine who the client is and what client payload key to associate with the file object or data for payload encryption or decryption. One of the key features is the ability to encrypt the payload data at the file object level and associate the client's payload key to the file object.

Some advantages for various embodiments of the above: Implementing this disclosure in hardware using FPGAs or ASIC for, for example, 10 Gigabits to 100 Gigabits or higher data rates provides reliability against external attacks on the encryption system. Centralized encryption simplifies user management of site-wide data encryption. High-rate encryption enables remote storage without detriment to user experience. In one embodiment, a cipher or encryption algorithm for the foregoing can be implemented using a systolic matrix architecture as referred to below.

Additional Encryption Gateway Embodiments

In one embodiment, a first computing device is configured as an encryption gateway, the first computing device comprises at least one processor (e.g., for data path and/or cryptographic processing) and at least one memory. The encryption gateway is configured to authenticate a client using one or multiple authentication factors, and further configured to receive TLS (or other transport encryption) data from a client application. The encryption gateway will terminate the client TLS connection and extract the payload and encrypt the payload with authentication. Next, the encryption gateway inserts the encrypted-authenticated payload into the cloud or data server TLS data packet/format. The encryption gateway establishes a cloud or data server TLS connection. The cloud or data server terminates the TLS connection, which includes TCP termination, and stores the encrypted-authenticated payload in the cloud or data server memory.

In one embodiment, an approach terminates a client TLS connection which also includes TCP termination, extracts data from a payload and encrypts the extracted data with authentication (using an encryption key from a key manager). A TLS connection is set-up to a cloud or data server, and the encrypted authenticated data is inserted into a TLS cloud payload with key association information. The cloud or data server terminates the TLS connection and the encrypted authenticated payload data is stored on the cloud or data server memory/storage.

This section below describes embodiments regarding a design of a, for example, 100 Gbps-full duplex link that uses both data-at-rest encryption and full TLS transport security. The design is not limited to TLS and Cloud Services file encryption, and this description is an example and discussion of the tradeoffs of a single embodiment of the general design. In one embodiment, the TLS algorithm can be implemented using a systolic matrix architecture as referred to below.

TLS background (used in this example) and other transport encryption methods are, for example, IPSEC, MACSEC, or a custom method. In one embodiment, the transport and packet processing can be implemented using a systolic matrix architecture as referred to below.

In one embodiment, Transport Layer Security (TLS) or Secure Socket Layer (SSL) is used to secure data in flight at Layer 6 of the OSI model. It provides both certificate authentication and transport encryption for all application layer data. In the context of remote cloud storage, TLS gives the client confidence that its data is only connected to the cloud service provider.

TLS operates by negotiating a session key per TLS or Secure Socket Layer (SSL) connection. A single TLS connection is not a burden, but as the number of TLS connections that are negotiated within a device increases, the connections become increasingly burdensome in both computational requirements and real-time delay.

In-Line Encryption

Option 1: Clients and Servers Use HTTPS Connections

Figure 5:
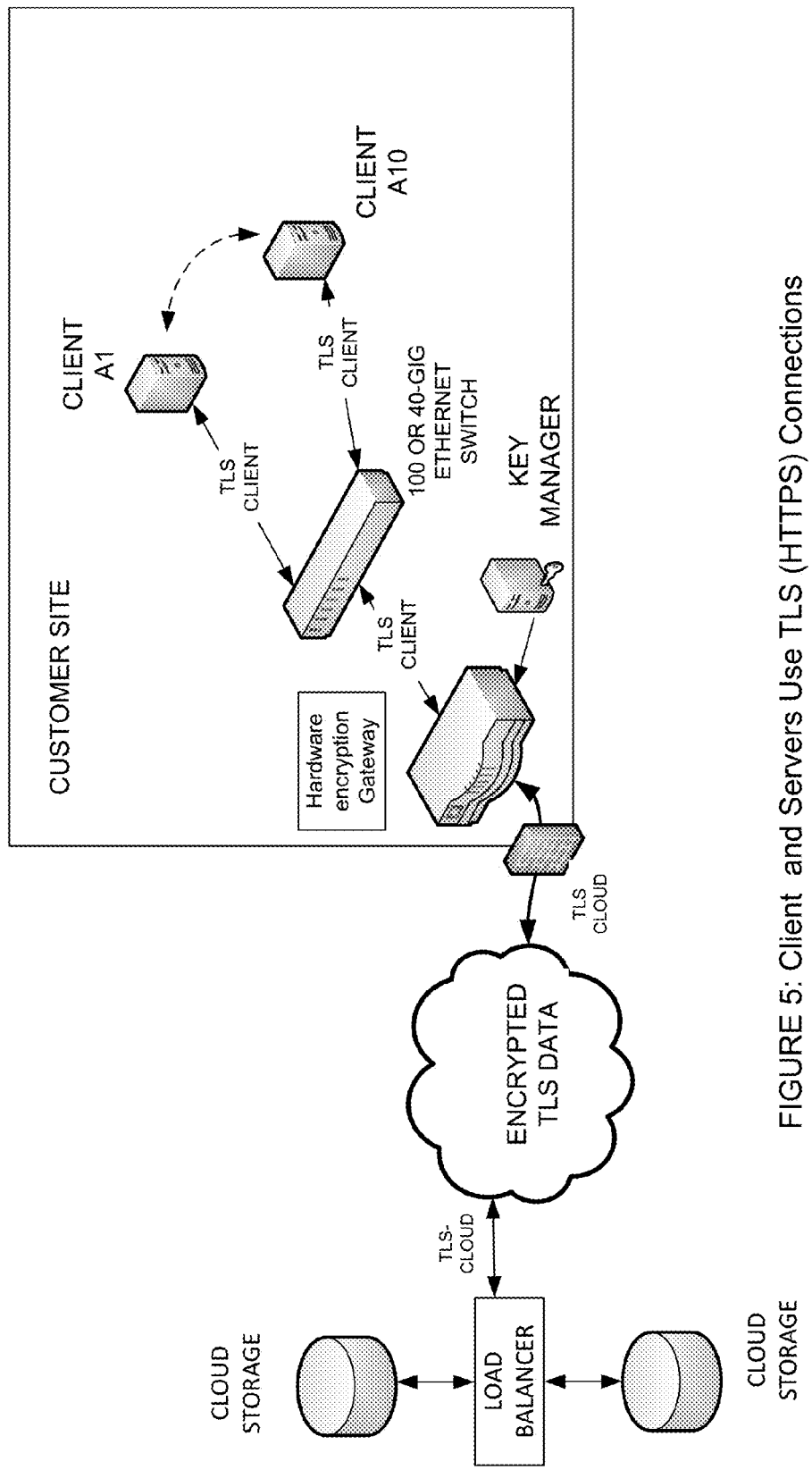
FIG. 5 shows clients and servers using TLS (HTTPS) connections in one embodiment.

In order to encrypt the HTTP information in-line, the hardware encryption gateway acts as a TLS proxy between client applications and cloud storage as shown in FIG. 5.

Figure 6:
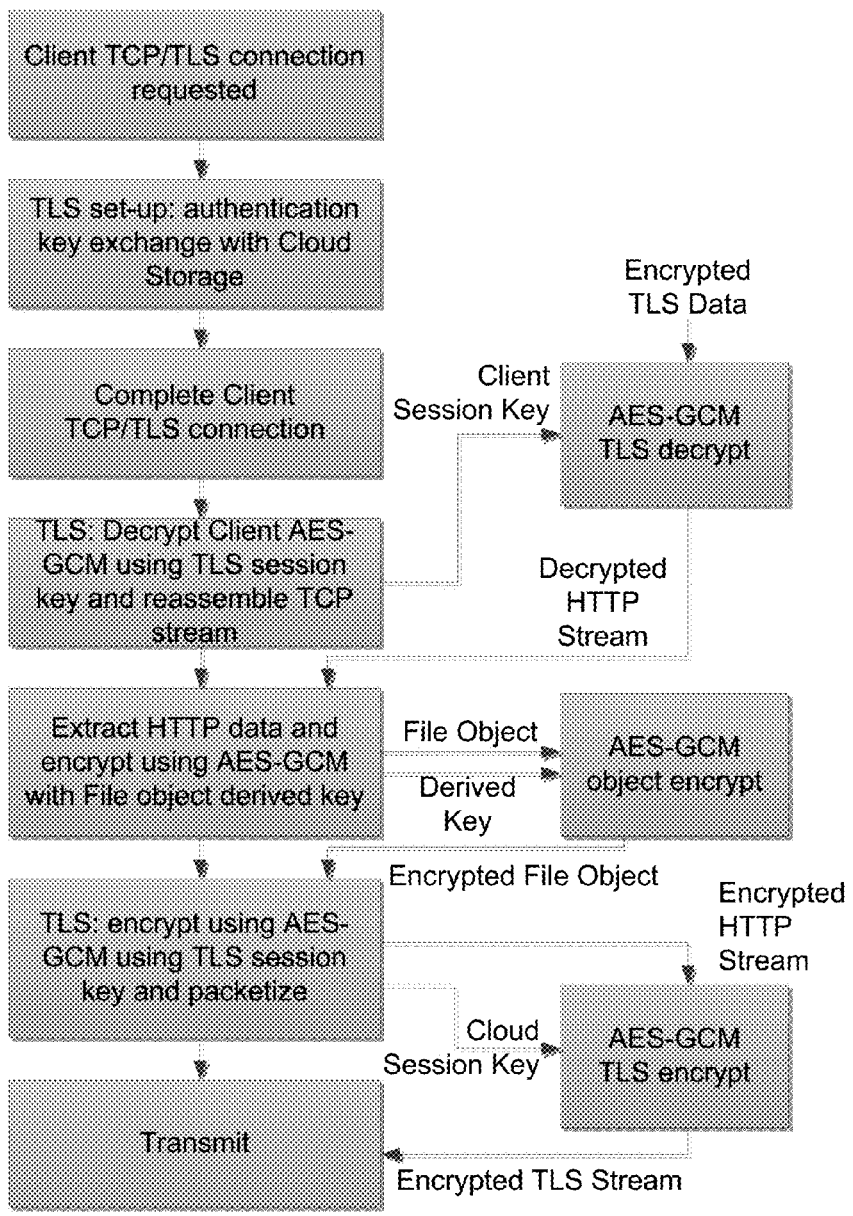
FIG. 6 shows a TLS (HTTPS) proxy data flow in one embodiment.

FIG. 6 shows a flow chart describing the process of decrypting and re-encrypting the TLS connections.

The encryption gateway negotiates a TLS connection to the client and a TLS connection to the cloud servers. Before encrypting the file object for data-at-rest, the client TLS encryption will be decrypted using the client session key. The file object will be encrypted using a key derived from the file object metadata (Object ID for example). After encrypting the file object, the HTTP stream will be TLS encrypted for transport to the cloud server using the cloud session key.

This option allows both cloud servers and client applications to continue operating transparently, provided the proxy (Hardware Encryption Gateway) is able to provide a valid cloud certificate to the client. If the proxy does not have a valid certificate for the cloud domain, the clients would need to accept the proxy certificate as a security exception.

The cost of Hardware Encryption Gateway using TLS for both the client and the cloud server is that the number of TLS negotiations required has doubled compared to not using a proxy. This can reduce throughput performance for clients due to added TLS negotiation time, especially for small-sized files. This also puts a heavy burden on the proxy (Hardware Encryption Gateway) because it must deal with the aggregate client TLS sessions.

Option 2: Clients Use HTTP, Cloud Storage Uses HTTPS

Figure 7:
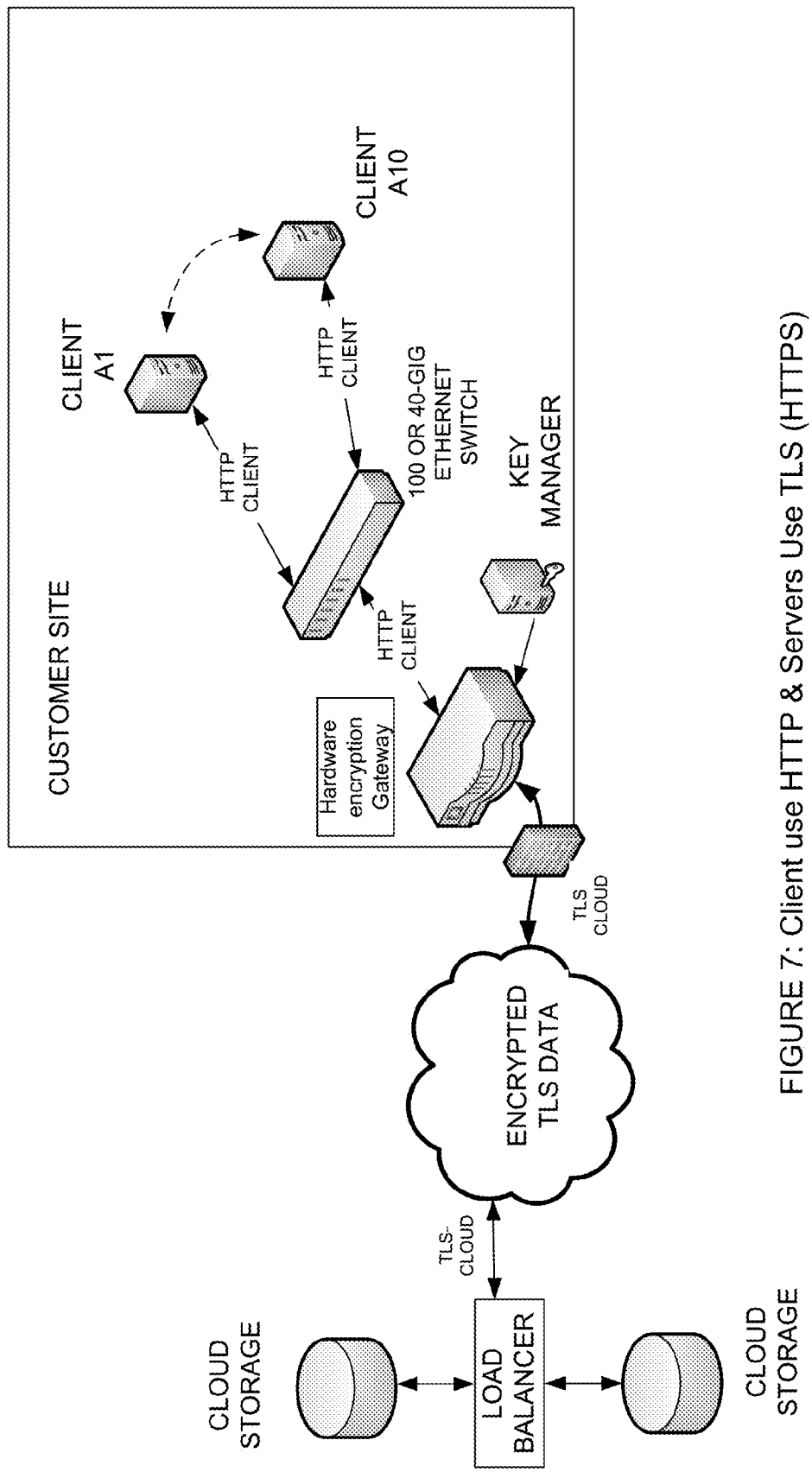
FIG. 7 shows clients using HTTP and server using TLS (HTTPS) in one embodiment.

In order to reduce the performance impact of the insertion of the TLS proxy (Hardware Encryption Gateway) and ease the burden on the proxy, we can attempt to reduce the number of TLS connections in the system. One way of doing this is to modify the client connection to use an unencrypted HTTP connection. Because all client-to-proxy connections are contained within the customer site, this is a low risk change to the internal network security as shown in FIG. 7.

Because the clients are modified to communicate using HTTP only, Hardware Encryption Gateway would act as a client-only TLS proxy. Hardware Encryption Gateway will modify the client HTTP packets to the HTTPS. This will reduce the number of TLS negotiations in half from the full HTTPS option, and will remove a level of decryption in client-to-proxy traffic and a level of encryption in the proxy-to-client traffic, relieving both client and proxy of that computational burden. Note that this solution may require a change to the client side software.

Figure 8:
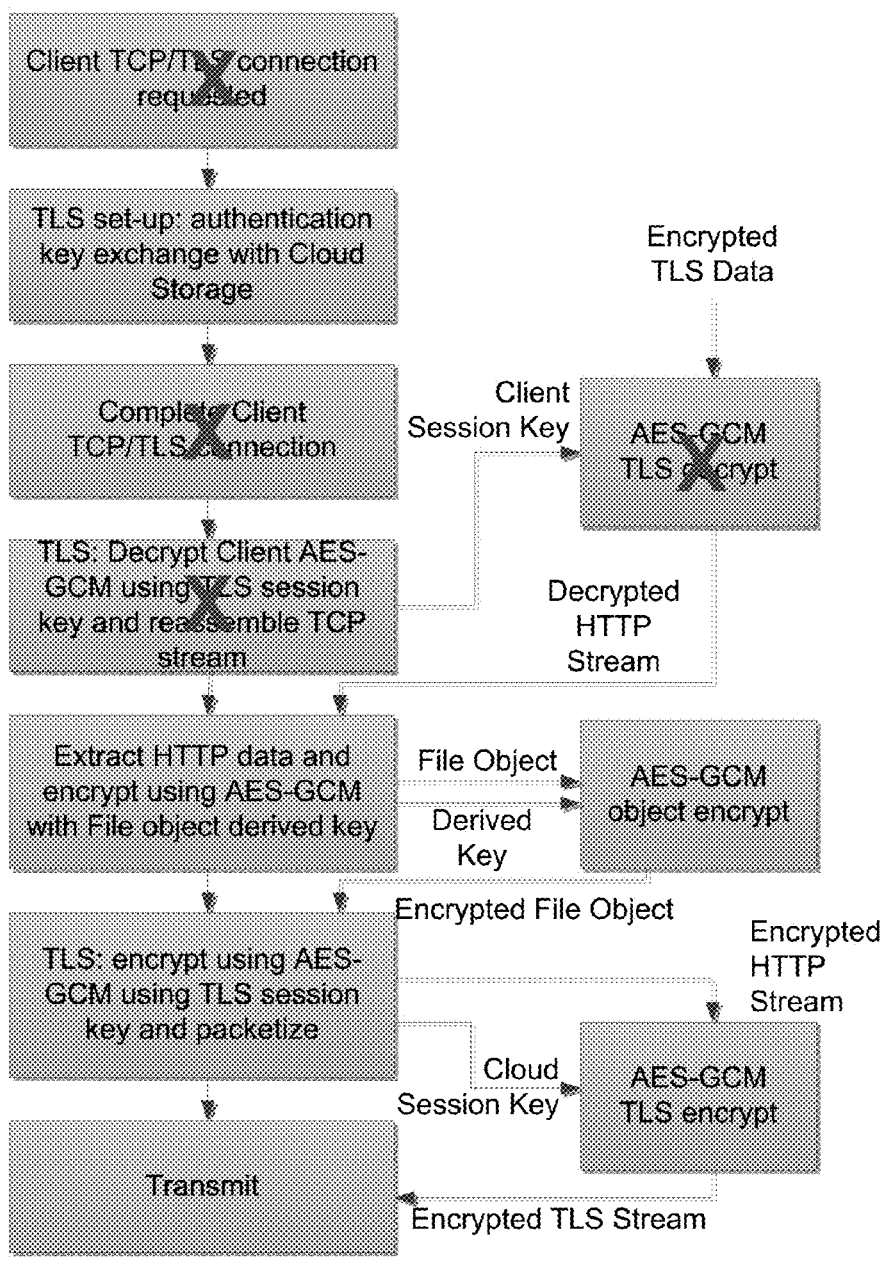
FIG. 8 shows HTTP client to TLS (HTTPS) server proxy connection data flow in one embodiment.

An illustration of the steps saved by removing encryption to the client is in FIG. 8.

Option 3: Proxy to Server Optimization

Option 3 outlines potential performance optimizations that could reduce the number of TLS negotiations that are needed between cloud server and proxy from the direct-connect HTTPS network used in both Options 1 and 2. In this optimization, the TLS proxy (Hardware Encryption Gateway) opens and maintains persistent TLS connections to the cloud servers and tunnels the various client connections through those tunnels as shown in FIG. 9.

Hardware Encryption Gateway would set up TLS sessions with a cloud server before clients initiate any data transfer. As clients move data to/from the cloud servers, Hardware Encryption Gateway would use a pre-opened TLS session for the client, modifying the client IP address and port number to that of the active TLS session.

In addition, for client-to-server traffic, Hardware Encryption Gateway would insert a TLS header, modify the server TCP port number to HTTPS, and perform all the necessary TLS encryption and authentication. For server-to-client traffic, Hardware Encryption Gateway would reverse the process described above. In one embodiment, there is a need to determine the duration the TLS sessions can be kept alive before the link would need to be renegotiated, as well as on potential impact on the cloud Load Balancers.

This option can be used in combination with either Option 1 or Option 2. In either case, it would reduce the number of proxy-to-server TLS sessions required especially in the case of many short-lived client connections. This option also disassociates the lag of proxy-to-server connections from the client-to-proxy connections so that the client does not see additional latency in individual client connections.

In conclusion, in various embodiments a general hardware aggregated encryption gateway enables centralized encryption of communications leaving a corporate or other site. In one embodiment, the above Hardware Encryption Gateway can negotiate hundreds of TLS connections per second and maintain thousands of TCP connections simultaneously. In one embodiment, the Hardware Encryption Gateway is programmable for real-time HTTP 100 Gbs full duplex TLS and data at rest encryption that is transparent to clients and cloud.

In some embodiments, the encryption gateway may be implemented by or use encryption/decryption and/or communication methods and systems as described in U.S. patent application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, and/or as described in U.S. patent application Ser. No. 14/219,651, filed Mar. 19, 2014, entitled "SECURE END-TO-END COMMUNICATION SYSTEM," by Richard J. Takahashi. For example, the encryption gateway may use systolic matrix packet engines and multiplexers to process and route packets or other data, as described in the foregoing applications.

Closing

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the communication system may be implemented using one or more computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement one or more of the following: an encryption gateway, a router, a switch, a key manager, a client application, cloud storage, a load balancer, and a firewall.

In one embodiment, a data processing system such as the computing device above is used to implement a user terminal, which may provide a user interface for control of a computing device. For example, a user interface may permit configuration of the encryption gateway. A user terminal may be in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   at least one memory to store at least one key associated to a first client of a plurality of clients;
   a first computing device configured as an encryption gateway to communicate with the first client using a client-side transport protocol, and to communicate with a remote cloud storage or server using a remote-side transport protocol, the first computing device comprising at least one processor, and the first computing device further configured to:
      authenticate the first client using at least one authentication factor,
      receive data in a payload from the first client,
      decrypt the received data using the client-side transport protocol to provide first decrypted data,
      encrypt the first decrypted data using the at least one key to provide first encrypted data,
      encrypt the first encrypted data using the remote-side transport protocol to provide second encrypted data, and
      send the second encrypted data to the remote cloud storage or server; and
   a key manager configured to provide the at least one key to the encryption gateway for storage in the at least one memory.

2. The system of claim 1, wherein the remote-side transport protocol is transport layer security or Internet protocol security.

3. The system of claim 1, wherein the encryption gateway receives authentication information from the first client for requesting at least one key from the key manager.

4. The system of claim 1, wherein the encryption gateway uses symmetric encryption with authentication to encrypt the first decrypted data using the at least one key.

5. The system of claim 1, wherein the key manager loads the at least one key into the encryption gateway via a secure port of the first computing device or over a client-side network.

6. The system of claim 5, wherein the at least one key is associated to the first client when loaded by the key manager.

7. The system of claim 1, wherein the key manager communicates with the remote-side transport protocol to determine at least one key for use in the encryption of the data.

8. The system of claim 7, wherein the data is encrypted at a file object level, and at least one key is associated to a file object.

9. The system of claim 1, wherein the encryption gateway negotiates an encrypted connection to the remote cloud storage or server, the encryption gateway negotiates an encrypted connection to the first client, and the first client communicates with the encryption gateway in a client session using the client-side transport protocol.

10. The system of claim 9, wherein the encryption gateway decrypts the received data from the first client using a client session key of the client session.

11. The system of claim 10, wherein the first encrypted data is encrypted by the encryption gateway using a cloud session key associated with the encrypted connection to the remote cloud storage or server.

12. The system of claim 1, wherein the encryption gateway sets up a transport session with the remote cloud storage or server prior to receiving the payload from the first client, and the encryption gateway uses the transport session for sending data from each of the plurality of clients, including the first client, to the remote cloud storage or server.

13. The system of claim 12, wherein the encryption gateway modifies or inserts a header in a transport connection to associate the first client on a remote connection, or the encryption gateway modifies or inserts a header in a file object to associate the first client on a remote connection.

14. The system of claim 1, wherein the key manager is implemented using the first computing device or a second computing device.

15. A method, comprising:
storing, in a memory of an encryption gateway, a key associated to a first client of a plurality of clients, the first client communicating with the encryption gateway using a client-side transport protocol;
receiving, by the encryption gateway from the first client, a first request to read data or a file object from a remote cloud storage or server, the remote cloud storage or server communicating with the encryption gateway using a remote-side transport protocol;
in response to the first request, sending, by the encryption gateway, a second request to the remote cloud storage or server for the data or file object;
in response to the second request, receiving, by the encryption gateway, the data or the file object in a first payload from the remote cloud storage or server, wherein the data or the file object has been encrypted using the remote-side transport protocol;
decrypting, by at least one processor of the encryption gateway, the received data or the file object in the first payload using the remote-side transport protocol to provide first decrypted data;
decrypting, by the encryption gateway, the first decrypted data using the key associated to the first client to provide second decrypted data, wherein the key is retrieved from the memory of the encryption gateway;
encrypting, by the encryption gateway, the second decrypted data using the client-side transport protocol to provide first encrypted data; and
sending, from the encryption gateway to the first client, the first encrypted data.

16. The method of claim 15, further comprising:
terminating, by the encryption gateway, client-side communication with the first client;
performing decryption on a transmission control protocol stream of data associated with an encryption algorithm; and
receiving data for transport encryption of a second payload that is independent of the first payload.

17. A system, comprising:
at least one processor of an encryption gateway; and
memory storing instructions configured to instruct the at least one processor to:
receive, from a first client communicating with the encryption gateway using a client-side transport protocol, data in a payload;
decrypt the received data using the client-side transport protocol to provide first decrypted data;
receive, from a key manager, at least one key associated to the first client;
encrypt the first decrypted data using the at least one key to provide first encrypted data;
encrypt the first encrypted data using a remote-side transport protocol associated with a remote cloud storage or server to provide second encrypted data; and
send the second encrypted data to the remote cloud storage or server.

18. The system of claim 17, wherein the data in the payload from the first client is received by a multiplexer or a packet engine of the encryption gateway.

19. The system of claim 17, wherein the second encrypted data is sent to the remote cloud storage or server by a packet engine of the encryption gateway.

* * * * *